(12) United States Patent
Kou et al.

(10) Patent No.: US 12,308,976 B2
(45) Date of Patent: May 20, 2025

(54) MULTI-CELL TRANSMISSION SCHEDULING

(71) Applicant: ZTE Corporation, Guangdong (CN)

(72) Inventors: Shuaihua Kou, Guangdong (CN); Wei Gou, Guangdong (CN); Peng Hao, Guangdong (CN); Xing Liu, Guangdong (CN); Junfeng Zhang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 356 days.

(21) Appl. No.: 17/876,015

(22) Filed: Jul. 28, 2022

(65) Prior Publication Data

US 2022/0368470 A1    Nov. 17, 2022

Related U.S. Application Data

(63) Continuation of application No. PCT/CN2020/121017, filed on Oct. 15, 2020.

(51) Int. Cl.
*H04L 1/1829* (2023.01)
*H04L 1/1812* (2023.01)
*H04W 72/20* (2023.01)

(52) U.S. Cl.
CPC .......... *H04L 1/1854* (2013.01); *H04L 1/1812* (2013.01); *H04W 72/20* (2023.01)

(58) Field of Classification Search
CPC ..... H04L 1/1854; H04L 1/1812; H04W 72/20
See application file for complete search history.

(56) References Cited

U.S. PATENT DOCUMENTS

| 2015/0365931 A1 | 12/2015 | Ng et al. |
| 2018/0115394 A1 | 4/2018 | Harada et al. |

(Continued)

FOREIGN PATENT DOCUMENTS

| CN | 107211394 A | 1/2020 |
| KR | 20150090601 A | 8/2015 |
| KR | 20160094033 A | 8/2016 |

(Continued)

OTHER PUBLICATIONS

Huawei et al., "HARQ design for LAA," 3GPP TSG RAN WG1 Ad-hoc Meeting, Paris, France, R1-151120, 5 pages, Mar. 24-26, 2015.

(Continued)

*Primary Examiner* — Won Tae C Kim
(74) *Attorney, Agent, or Firm* — Perkins Coie LLP

(57) ABSTRACT

Methods, apparatus, and systems that enable scheduling of related data transmissions across multiple cells and/or carriers are disclosed. In one example aspect, a method for wireless communication includes processing, by a base station, a first data transmission for a user device on a first serving cell and transmitting, by the base station to the user device, a control message that includes a scheduling information of a second data transmission on a second cell that is different than the first serving cell. The control message indicates whether the second data transmission is a new data transmission or a retransmission of the first data transmission. The method also includes processing, by the base station, the second data transmission for the user device on the second cell according to the scheduling information.

16 Claims, 10 Drawing Sheets

(56) References Cited

U.S. PATENT DOCUMENTS

2022/0322098 A1* 10/2022 Dudda .................. H04W 24/08
2023/0209627 A1* 6/2023 Wu ...................... H04L 5/0094
   370/329

FOREIGN PATENT DOCUMENTS

WO    2014101061 A1    7/2014
WO    2016161558 A1    10/2016

OTHER PUBLICATIONS

International Search Report and Written Opinion for International Application No. PCT/CN2020/121017, mailed on Jul. 16, 2021 (6 pages).
CNIPA, First Office Action for Chinese Application No. 202080095477.6, mailed on Aug. 14, 2024, 33 pages with unofficial English translation.
Huawei et al., "HARQ enhancements in NR unlicensed," 3GPP TSG RAN WG1 #94, Gothenburg, Sweden, R1-1808063, Aug. 20-24, 2018, 8 pages.
ZTE, "Control signalling and HARQ related issues for Licensed-assisted access using LTE," 3GPP TSG RAN WG1 #81, Fukuoka, Japan, R1-153013, May 25-29, 2015, 4 pages.

* cited by examiner

MULTI-CELL TRANSMISSION SCHEDULING

CROSS REFERENCE TO RELATED APPLICATIONS

This patent document is a continuation of and claims benefit of priority to International Patent Application No. PCT/CN2020/121017, filed on Oct. 15, 2020. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques that enable scheduling of related transmissions across multiple cells and/or carriers, thereby reducing scheduling latencies.

In one example aspect, a method for wireless communication includes processing, by a base station, a first data transmission for a user device on a first serving cell. The method includes transmitting, by the base station to the user device, a control message that includes a scheduling information of a second data transmission on a second cell that is different than the first serving cell. The control message indicates whether the second data transmission is a new data transmission or a retransmission of the first data transmission. The method also includes processing, by the base station, the second data transmission for the user device on the second cell according to the scheduling information.

In another example aspect, a method for wireless communication includes processing, by a user device, a first data transmission on a first serving cell and receiving, by the user device, a control message that includes a scheduling information of a second data transmission on a second cell that is different than the first serving cell. The control message indicates whether the second data transmission is a new data transmission or a retransmission of the first data transmission. The method also includes processing, by the user device, the second data transmission on the second cell according to the scheduling information.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

Ultra-Reliable Low-Latency communication (URLLC) is one of several different types of use cases supported by the 5G New Radio (NR) standard for providing latency-sensitive services, such as factory automation, autonomous driving, or robotic surgeries. The URLLC wireless connectivity imposes high latency requirements to limit latency to be 1 ms or less.

Figure 1A:
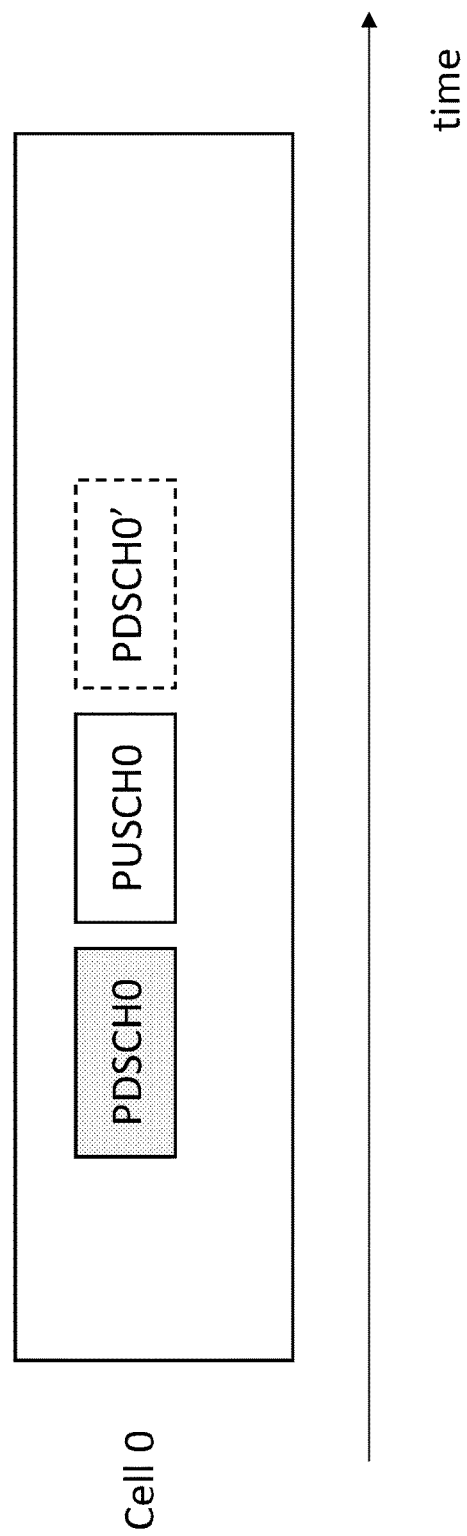
FIG. 1A illustrates an example scenario of a delayed scheduling of a data retransmission.

In current wireless communication systems, a wireless communication node (e.g., a base station) can schedule data transmission and corresponding retransmissions in the same serving cell only. However, in the event of a failed data transmission, re-transmission of the data may not be scheduled fast enough to meet the latency requirements of URLLC. FIG. 1A illustrates an example scenario 100 of a delayed scheduling of a data retransmission. A transmission on the Physical Downlink Shared Channel (PDSCH), PDSCH0, fails to be performed successfully and requires a retransmission of the data. However, a transmission on the Physical Uplink Shared Channel (PUSCH), PUSCH0, has been scheduled after the PDSCH0 in the time domain. The retransmission PDSCH0' must be scheduled after PUSCH0, leading to extended delay. Similarly, a new data transmission that is associated with a prior transmission may undergo extra scheduling delays on the same cell if other transmissions have already been scheduled.

Figure 1B:
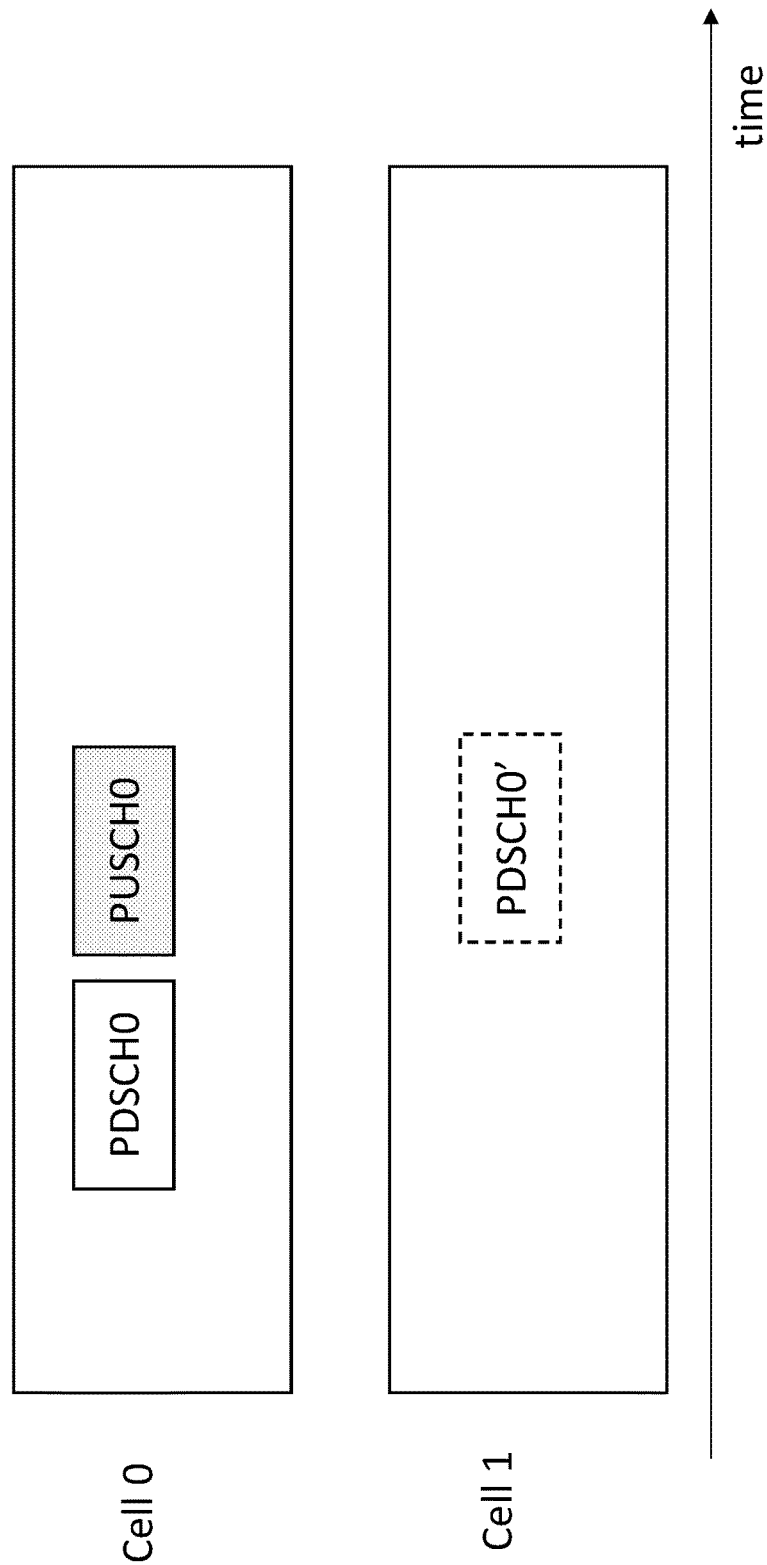
FIG. 1B illustrates an example scenario of multi-cell scheduling in accordance with the present technology.

To increase bandwidth and transmission bitrate, multiple cells and/or carriers, which has been leveraged in techniques such as carrier aggregation, have been long adopted in the wireless communication systems. This patent document discloses techniques that can be implemented in various embodiments to allow scheduling of related data transmissions across multiple cells and/or carriers so as to minimize scheduling delay. FIG. 1B illustrates an example scenario 150 of multi-cell scheduling in accordance with the present technology. As shown in FIG. 1B, instead of scheduling the retransmission PDSCH0' after PUSCH0 in Cell 0, PDSCH0' can be scheduled in Cell 1, which is a cell that corresponds to Cell 0, so as to minimize scheduling latency. The disclosed techniques are not only applicable to retransmission, but also applicable to transmissions in different directions (e.g., uplink, downlink, sidelink) that are related to each other.

Figure 2:
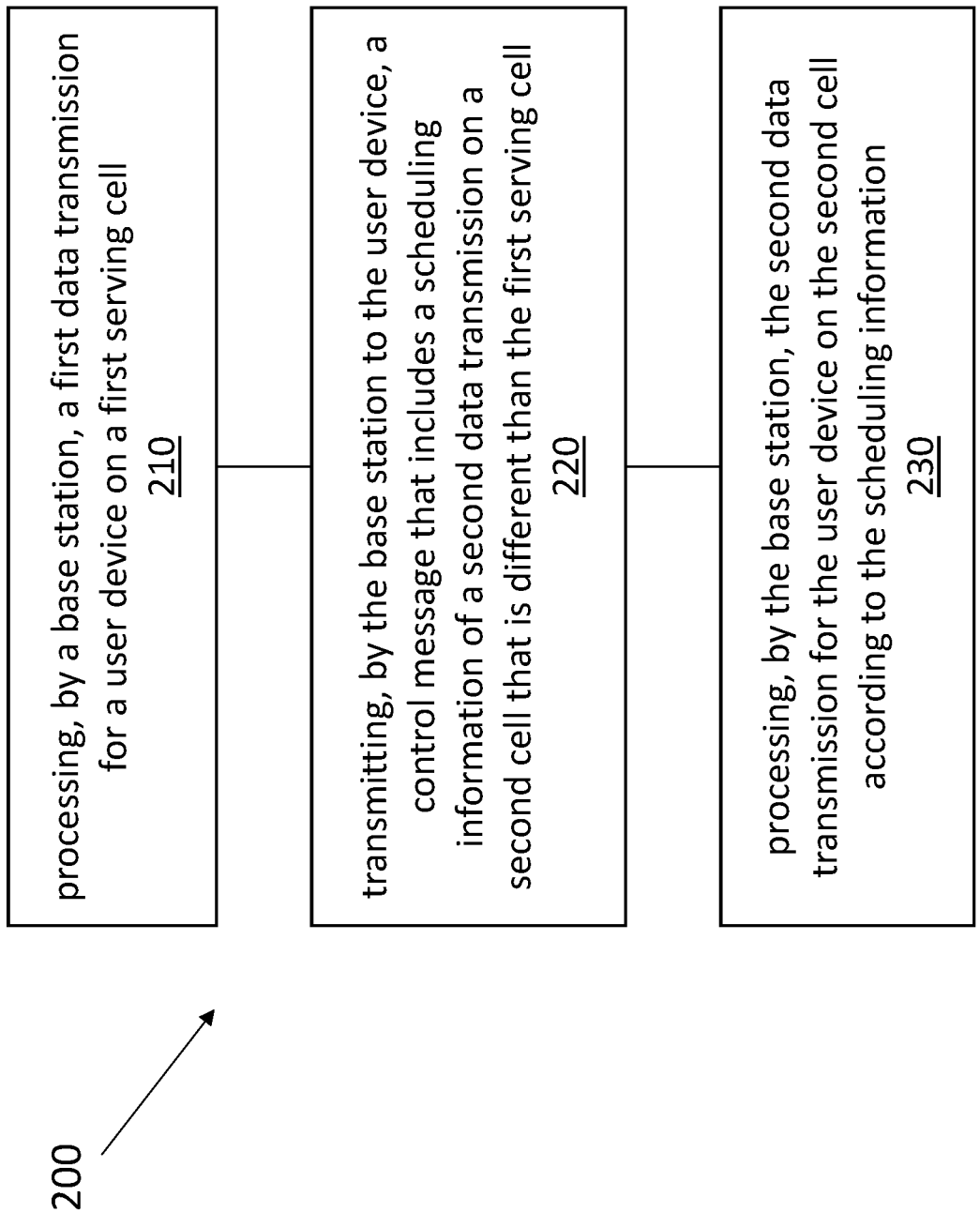
FIG. 2 is a flowchart representation of a method for wireless communication in accordance with the present technology.

FIG. 2 is a flowchart representation of a method 200 for wireless communication in accordance with the present technology. The method 200 includes, at operation 210, processing, by a base station, a first data transmission for a user device on a first serving cell. The method 200 includes, at operation 220, transmitting, by the base station to the user device, a control message that includes a scheduling information of a second data transmission on a second cell that is different than the first serving cell. The control message indicates whether the second data transmission is a new data transmission or a retransmission of the first data transmission. The method 200 also includes, at operation 230, processing, by the base station, the second data transmission for the user device on the second cell according to the scheduling information. The first transmission and the second transmission can be downlink transmissions from the base station to the user device, uplink transmissions from the user device to the base station, and/or sidelink transmissions between the user device and another user device.

In some embodiments, the first transmission is a prior transmission corresponding to the second transmission. The control message comprises a first identifier for the first serving cell and a first Hybrid Automatic Repeat Request (HARQ) process number for the first data transmission. The control message further comprises a second identifier for the second cell and a second HARQ process number for the second data transmission.

In some embodiments, the control message comprises a second identifier for the second cell and a second HARQ process number for the second data transmission. There exists an association between the second cell and the first serving cell (e.g., a predefined mapping relation). In some embodiments, the association specifies that a first set of HARQ processes of the first serving cell corresponds to a second set of HARQ processes of the second cell. In some embodiments, the association specifies that the first serving cell and the second cell share a same HARQ process or a same HARQ entity.

In some embodiments, whether the second data transmission is a new data transmission or a retransmission of the first data transmission is determined based on a first HARQ process number of the first data transmission and a second HARQ process number of the second data transmission. In some embodiments, the second data transmission is a retransmission of the first data transmission in case the second HARQ process number belongs to the second set of the HARQ processes of the second cell.

In some embodiments, the control message is transmitted in the first serving cell or the second cell. In some embodiments, the first serving cell comprises a first carrier and a second carrier that is associated with the first carrier. The first data transmission is performed in the first carrier of the first serving cell. The method also includes transmitting, by the base station to the user device, a second control message that includes scheduling information of a third data transmission in a second carrier of the first serving cell; and processing, by the base station, the third data transmission for the user device in the second carrier. In some embodiments, at least one of the control message or the second control message comprises an indicator indicating a carrier to be used for the second data transmission or the third data transmission.

Figure 3:
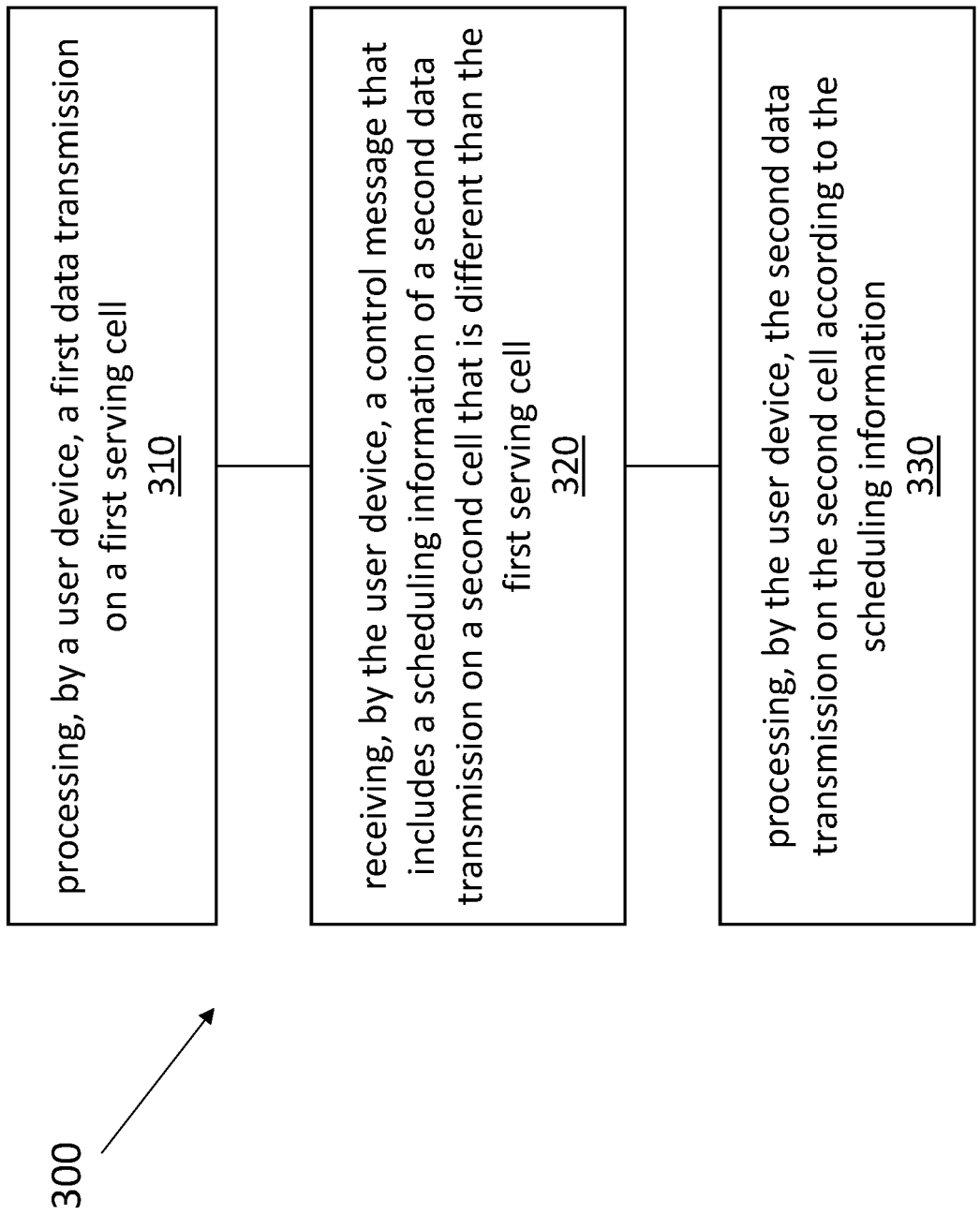
FIG. 3 is a flowchart representation of another method for wireless communication in accordance with the present technology.

FIG. 3 is a flowchart representation of a method 300 for wireless communication in accordance with the present technology. The method 300 includes, at operation 310, processing, by a user device, a first data transmission on a first serving cell. The method 300 includes, at operation 320, receiving, by the user device, a control message that includes a scheduling information of a second data transmission on a second cell that is different than the first serving cell. The control message indicates whether the second data transmission is a new data transmission or a retransmission of the first data transmission. The method 300 includes, at operation 330, processing, by the user device, the second data transmission on the second cell according to the scheduling information. The first transmission and the second transmission can be downlink transmissions from the base station to the user device, uplink transmissions from the user device to the base station, or sidelink transmissions between the user device and another user device.

In some embodiments, the first transmission is a prior transmission corresponding to the second transmission. The control message comprises a first identifier for the first serving cell and a first Hybrid Automatic Repeat Request (HARQ) process number for the first data transmission. The control message further comprises a second identifier for the second cell and a second HARQ process number for the second data transmission.

In some embodiments, the control message comprises a second identifier for the second cell and a second HARQ process number for the second data transmission. There exists an association between the second cell and the first serving cell (e.g., a predefined mapping relation). In some embodiments, the association specifies that a first set of HARQ processes of the first serving cell corresponds to a second set of HARQ processes of the second cell. In some embodiments, the association specifies that the first serving cell and the second cell share a same HARQ process or a same HARQ entity.

In some embodiments, whether the second data transmission is a new data transmission or a retransmission of the first data transmission is determined based on a first HARQ process number of the first data transmission and a second HARQ process number of the second data transmission. In some embodiments, the second data transmission is a retransmission of the first data transmission in case the second HARQ process number belongs to the second set of the HARQ processes of the first serving cell.

In some embodiments, the control message is transmitted in the first serving cell or the second cell. In some embodiments, the first serving cell comprises a first carrier and a second carrier that is associated with the first carrier. The first data transmission is performed in the first carrier of the first serving cell. The method also includes receiving, by the user device from the base station, a second control message that includes scheduling information of a third data transmission in a second carrier of the first serving cell; and performing, by the user device, the third data transmission with the base station in the second carrier. In some embodiments, at least one of the control message or the second control message comprises an indicator indicating a carrier to be used for the second data transmission or the third data transmission.

Some examples of the disclosed techniques are further described in the following example embodiments.

Embodiment 1

The base station can schedule data transmissions over one or more data channels (e.g., the Physical Downlink Shared Channel, PDSCH, or the Physical Uplink Shared Channel, PUSCH) using control information (e.g., Downlink Control Indication, DCI) carried by a control channel (e.g., the Physical Downlink Control Channel, PDCCH). For example, the base station schedules a first data transmission from the base station to the user device in the serving cell using a first DCI signaling message. The base station then performs a downlink data transmission to the user device in the serving cell. When the downlink data transmission fails to complete successfully (e.g., the base station receives a non-acknowledgement or a negative acknowledge indication, NACK, from the user device), the base station can schedule a retransmission of the data transmission in another cell using a second DCI signaling message to minimize scheduling delays.

In some embodiments, control information carried by a control channel schedules a data transmission on a data channel. The control information includes at least the configuration information of the scheduled transmission and the configuration information of a prior transmission of the scheduled transmission. The presence of the configuration information of the prior transmission of the scheduled transmission in the control information is configured by the network or defined by the specification.

The control information that schedules the transmissions can include at least one or more hybrid automatic repeat request (HARQ) process number fields, and/or one or more cell information fields to indicate the cells for carrying the transmissions and the association between the transmissions. For example, the control information can carry the HARQ process numbers and cell information for both the scheduled transmission and the corresponding prior transmission. A first HARQ process number field in the control information indicates the HARQ process number for a prior transmission. A second HARQ process number field in the control information indicates the HARQ process number of the scheduled transmission. For example, for the first data transmission, the first HARQ process number in the first DCI signaling message can be set to a default value (e.g., zero) because there is no prior transmission that is associated with it.

The control information can also include cell information for both the scheduled transmission and the corresponding prior transmission. For example, the control information includes a first cell information field to indicate the cell on which the prior transmission is transmitted. The control information also includes a second cell information field to indicate the cell on which the scheduled transmission is to be transmitted. For the first data transmission, the first cell information field can be set to a default value (e.g., zero) because there is no prior transmission that is associated with it.

In some embodiments, the control information can further include an indicator (e.g., a new data indicator, NDI) indicating whether the scheduled transmission is a new data transmission or a retransmission. When the user device receives the control information, the NDI included in the control information is compared to the value of the NDI of the prior transmission. In some embodiments, the NDI is a binary value represented by one bit. If the NDI in the control information is toggled as compared to the value of the NDI of the prior transmission, the scheduled transmission is considered to be a new transmission. If the NDI in the control information is the same as the value of the NDI of the prior transmission (e.g., not toggled), the scheduled transmission is considered to be a retransmission. The scheduled transmission can include one or more transport blocks (TBs). Each TB has a respective NDI. In some embodiments, for each TB, the corresponding NDI is compared to the value of the NDI of the prior transmission to determine whether the corresponding TB is a new transmission or retransmission.

In some embodiments, whether the scheduled transmission is a new data transmission or a retransmission is indicated based on the HARQ process numbers and/or cell information included in the control information. For example, when the first HARQ process number field and the second HARQ process number field have different values, the scheduled transmission is considered to be a retransmission. As another example, when the first cell information field and the second cell information field indicate two different cells, the scheduled transmission is considered to be a retransmission. In yet another example, the scheduled transmission is considered to be a retransmission when both the two HARQ process number fields and the two cell information fields have different values.

If the scheduled transmission is received by the UE and the scheduled transmission is considered to be a retransmission, data in the scheduled transmission and the data currently in the soft buffer are combined and then decoded. The data currently in the soft buffer includes at least the data in the prior transmission of the scheduled transmission. The scheduled transmission and the prior transmission can be performed in different cells.

If the scheduled transmission is transmitted by the UE and the scheduled transmission is considered to be retransmission, the data (e.g., transport block or media access control, MAC, protocol data unit, PDU) in the prior transmission is re-transmitted. In other words, deliver the uplink grant and the HARQ information (redundancy version) of the TB to the identified HARQ process and instruct the identified HARQ process to trigger a retransmission. The identified HARQ process is indicated by the second HARQ process number field in the control information. The scheduled transmission and the prior transmission can be performed in different cells.

Figure 4:
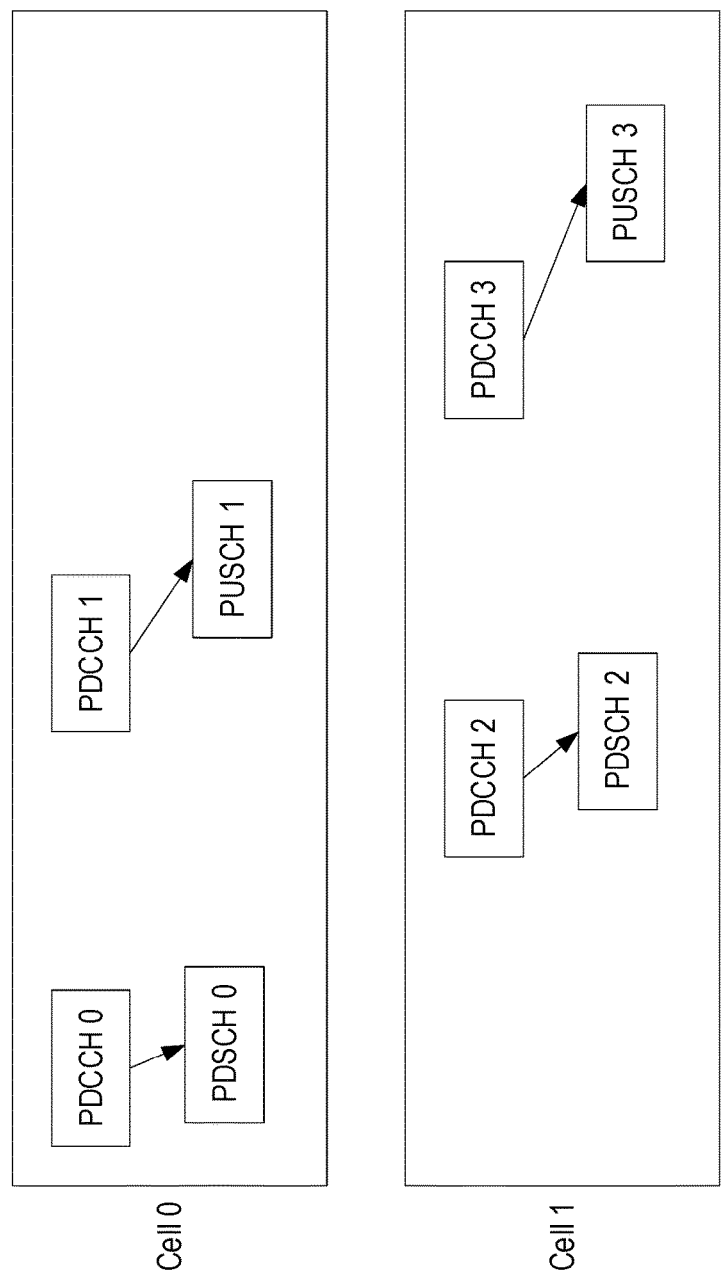
FIG. 4 illustrates an example transmission scheduling in accordance with the present technology.

FIG. 4 illustrates an example transmission scheduling 400 in accordance with the present technology. As shown in FIG. 4, the base station operates using different serving cells. For example, cell 0 is the primary serving cell that carries the PDCCH0, PDCCH1, PDSCH0, and PUSCH1. Control information in PDCCH0 schedules data transmissions in PDSCH0. Similarly, control information in PDCCH1 schedules data transmissions in PUSCH1. Cell 1 is a secondary serving cell that carries PDCCH2, PDCCH3, PDSCH2, and PUSCH3. Control information in PDCCH2 schedules data transmissions in PDSCH2. Similarly, control information in PDCCH3 schedules data transmissions in PUSCH3.

In this particular example, the HARQ process number for PDSCH0 is 3, which can be indicated in the control information carried in PDCCH0. PDCCH2 carries control information that schedules a transmission on PDSCH2 on cell 1. The control information includes a first HARQ process number 3 and a second HARQ process number 8. The control information can further include a first cell identifier 0 and a second cell identifier 1. Thus, PDSCH0 is the prior transmission of PDSCH2. In some embodiments, because the two HARQ process numbers are different (e.g., 3 and 8), it can be determined that PDSCH2 is a retransmission. In some embodiments, because the cell identifiers are also different (e.g., 0 and 1), it can be determined that PDSCH2 is a retransmission. The first HARQ process number carried in PDCCH2 is 3, which is equivalent to the HARQ process number for PDSCH0. The first cell identifier carried in PDCCH2 is 0, which is equivalent to the cell for PDSCH0. Thus, it can be determined that PDSCH2 is a retransmission of the PDSCH0.

In some embodiments, the control information can include an NDI indicating whether PDSCH2 is a new data transmission or a retransmission. For example, the NDI included in the control information carried in PDCCH0 is equal to 0. The NDI included in the control information carried in PDCCH2 is equal to 1. Alternatively, the NDI included in the control information carried in PDCCH0 is equal to 1 and the NDI included in the control information carried in PDCCH2 is equal to 0. Because the values are toggled, it can be determined that the PDSCH2 is a new data transmission. If the NDI included in the control information carried in PDCCH0 and the NDI included in the control information carried in PDCCH2 have the same value, it can be determined that the PDSCH2 is a re-transmission.

In some embodiments, a downlink data transmission can include multiple transport blocks (TBs). The control information can include multiple NDI values, each corresponding to a respective TB. For example, PDSCH0 can include two TBs. The control information carried in PDCCH0 can include two NDI values corresponding to the first TB and the second TB (e.g., 1 and 0 respectively). The control information carried in PDCCH2 also includes two NDI values corresponding to the first TB and the second TB (e.g., 1 and 1 respectively). Thus, it can be determined that the first TB in PDSCH2 is a retransmission while the second TB in PDSCH2 is a new data transmission.

If the PDSCH2 or the transport blocks in the PDSCH2 are a retransmission, the data in the PDSCH2 or the transport blocks are combined with the data currently in the soft buffer for PDSCH2 or for the transport blocks. Then the combined data are decoded by the UE. The data currently in the soft buffer for PDSCH2 includes at least the data in PDSCH0.

Referring back to FIG. 4, in the uplink direction, the HARQ process number for PUSCH1 is 5, which can be indicated in the control information carried in PDCCH1. PDCCH3 carries control information that schedules a transmission on PUSCH3 on cell 1. The control information includes a first HARQ process number 5 and a second HARQ process number 7. The control information can further include a first cell identifier 0 and a second cell identifier 1. In some embodiments, because the two HARQ process numbers are different (e.g., 5 and 7), it can be determined that PUSCH3 is a retransmission. In some embodiments, because the cell identifiers are also different (e.g., 0 and 1), it can be determined that PUSCH3 is a retransmission. The first HARQ process number carried in PDCCH3 is 5, which is equivalent to the HARQ process number for PUSCH1. The first cell identifier carried in PDCCH3 is 0, which is equivalent to the cell for PUSCH1. Thus, it can be determined that PUSCH3 is a retransmission of the PUSCH1.

In some embodiments, the control information can include an NDI indicating whether PUSCH3 is a new data transmission or a retransmission. For example, the NDI included in the control information carried in PDCCH1 is equal to 0. The NDI included in the control information carried in PDCCH3 is equal to 1. Alternatively, the NDI included in the control information carried in PDCCH1 is equal to 1 and the NDI included in the control information carried in PDCCH3 is equal to 0. Because the values are toggled, it can be determined that the PUSCH3 is a new data transmission. If the NDI included in the control information carried in PDCCH1 and the NDI included in the control information carried in PDCCH3 have the same value, it can be determined that the PUSCH3 is a re-transmission.

In some embodiments, an uplink data transmission can include multiple transport blocks (TBs). The control information can include multiple NDI values, each corresponding to a respective TB. For example, PUSCH1 can include two TBs. The control information carried in PDCCH1 can include two NDI values corresponding to the first TB and the second TB (e.g., 1 and 0 respectively). The control information carried in PDCCH3 also includes two NDI values corresponding to the first TB and the second TB (e.g., 1 and 1 respectively). Thus, it can be determined that the first TB in PUSCH3 is a retransmission while the second TB in PUSCH3 is a new data transmission.

If the PUSCH3 or the transport blocks in the PDSCH3 are retransmission, the data (e.g., TB or MAC PDU) transmitted in the PUSCH1 or in the transport blocks in PUSCH1 are retransmitted on PUSCH3.

In some embodiments, the association between Cell 1 and Cell 0 can be predefined/preconfigured by higher layer signaling. Thus, the control information does not need to include separate cell identifiers. When the first HARQ process number field and the second HARQ process number field have different values, it can be determined that the prior transmission is transmitted on the other cell (e.g., the associated cell). For example, it can be preconfigured that subsequent transmission associated with transmissions on Cell 0 are scheduled on Cell 1. PDCCH2 carries control information that includes the HARQ process numbers without explicitly indicating cell identifier(s). The user device can determine that PDSCH2 is a retransmission of the PDSCH0 based on the HARQ process numbers (e.g., 3 and 8) and the predefined/preconfigured association between the two cells.

Embodiment 2

Explicitly signaling of the HARQ process numbers and the cell information for both transmissions can increase signaling overhead. In some embodiment, to reduce and/or minimize scheduling overhead, the network can preconfigure the association between the cells and/or the HARQ process numbers. For example, it can be preconfigured that that transmissions associated with prior transmissions on a first cell are scheduled on a second cell. That is, the second cell corresponds to the first cell (and vice versa). It can also be configured that a first HARQ process of the first cell is associated with a second HARQ process of the second cell.

Figure 5:
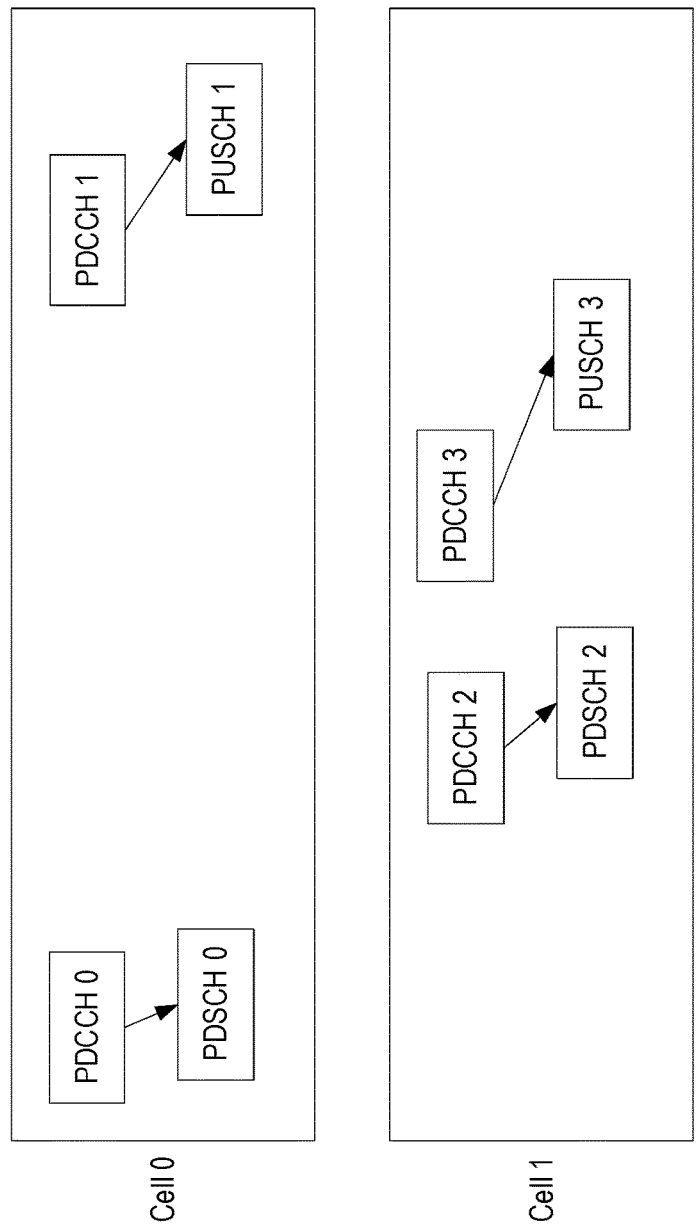
FIG. 5 illustrates another example transmission scheduling in accordance with the present technology.

FIG. 5 illustrates an example transmission scheduling in accordance with the present technology. As shown in FIG. 5, the base station operates using different serving cells. For example, Cell 0 is the primary serving cell that carries the PDCCH0, PDCCH1, PDSCH0, and PUSCH1. Control information in PDCCH0 schedules data transmissions in PDSCH0. Similarly, control information in PDCCH1 schedules data transmissions in PUSCH1. Cell 1 is a secondary serving cell that carries PDCCH2, PDCCH3, PDSCH2, and PUSCH3. Control information in PDCCH2 schedules data transmissions in PDSCH2. Similarly, control information in PDCCH3 schedules data transmissions in PUSCH3.

It can be configured that Cell 1 corresponds to Cell 0 and is to be used to schedule transmissions subsequent to transmissions performed on Cell 0 (and vice versa). Both Cell 0 and Cell 1 have HARQ processes with process numbers 0~16. In some embodiments, it can be further configured that HARQ process numbers 0~7 of Cell 0 correspond to HARQ process numbers 8~15 of Cell 1, respectively.

In some embodiments, HARQ processes of a cell can be divided into at least two parts. The first part of the HARQ processes is used to schedule transmissions corresponding to prior transmissions that have been transmitted on the same sell. The HARQ process number for the prior transmission and the HARQ process number for the scheduled transmission are the same. The second part of the HARQ processes is used to schedule transmissions corresponding to prior transmissions that have been transmitted on different cell(s). The HARQ process number for the prior transmission is associated with the HARQ process number of the scheduled transmission. For example, it can be configured that the first part of HARQ processes (e.g., HARQ process numbers 0~7) of Cell 0 is associated with the second part of HARQ processes (e.g., HARQ process numbers 8~15) of Cell 1, and the second part of HARQ processes (e.g., HARQ process numbers 8~15) of Cell 0 is associated with the first part of HARQ processes (HARQ process numbers 0~7) of Cell 1. The HARQ process number 0 of cell 0 is associated with the HARQ number 8 of the cell 1. The HARQ process number 1 of cell 0 is associated with the HARQ number 9 of the cell 1, and so on. The HARQ process number 8 of cell 0 is associated with the HARQ number 0 of the cell 1. The HARQ process number 9 of cell 0 is associated with the HARQ number 1 of the cell 1, and so on. Referring back to FIG. 5, the HARQ process number of PDSCH0 is 0. The HARQ process number for PDSCH2 is 8, which belongs to the second part of HARQ processes of Cell 1 used to schedule transmissions corresponding to prior transmissions that have been transmitted on Cell 0. Because the HARQ process number 0 of cell 0 is associated with the HARQ number 8 of the cell 1, the prior transmission of PDSCH2 is PDSCH0. If the HARQ process number for PDSCH2 is 2, which belongs to the first part of HARQ processes of Cell 1 used to schedule transmissions corresponding to prior transmissions that have been transmitted on the Cell 1. Therefore, the prior transmission of PDSCH2 is transmitted on the Cell 1 with the HARQ process number 2.

In some embodiments, the control information can further include an NDI indicating whether PDSCH2 is a new data transmission or a retransmission. For example, the NDI included in the control information carried in PDCCH0 is equal to 0. The NDI included in the control information carried in PDCCH2 is equal to 1. Alternatively, the NDI included in the control information carried in PDCCH0 is equal to 1 and the NDI included in the control information carried in PDCCH2 is equal to 0. Because the values are toggled, it can be determined that the PDSCH2 is a new data transmission. If the NDI included in the control information carried in PDCCH0 and the NDI included in the control information carried in PDCCH2 have the same value, it can be determined that the PDSCH2 is a re-transmission.

In some embodiments, a scheduled transmission with a HARQ process number in the second part of the HARQ processes is considered to be a retransmission regardless of the NDI value of the scheduled transmission. Referring back to FIG. 5, the HARQ process number for PDSCH2 is 8, which belongs to the second part of HARQ processes of Cell 1. Therefore, it is determined that PDSCH2 is a retransmission.

As another example, as shown in FIG. 5, the HARQ process number of PUSCH1 is 11 and the HARQ process number of PUSCH3 is 3. It has been preconfigured that HARQ process number 3 of Cell 0 corresponds HARQ process number 11 of Cell 1. The HARQ process number for PUSCH1 is 11, which belongs to the second part of HARQ processes of Cell 0 used to schedule transmissions corresponding to prior transmissions that have been transmitted on Cell 1. Therefore, it can be determined that the prior transmission of PUSCH1 is PUSCH3. Alternatively, it is determined that PUSCH1 is a retransmission.

Embodiment 3

In some embodiments, the network can configure that cells that are associated with each other share the same HARQ process(es) and/or HARQ entity. The control information that schedules the transmission can include at least the cell information (e.g., carrier indicator) for indicating the cell on which the scheduled transmission is transmitted. The scheduled transmission and the corresponding prior transmission are in the same direction—that is, they are both downlink, uplink, or sidelink transmissions. The scheduled transmission is one of the cells. The prior transmission of the scheduled transmission is the latest transmission on one of the cells before the scheduled transmission in the time domain. The prior transmission also has the same HARQ process number with the scheduled transmission. In some embodiments, the prior transmission of the scheduled transmission is a transmission scheduled by another set of control information (e.g., a different DCI signaling). For example, another DCI signaling message is transmitted first and is closest to the control information in the time domain. The DCI signaling includes the same HARQ process number with the control information. The scheduled transmission and the prior transmission can be on the different cells.

Figure 6:
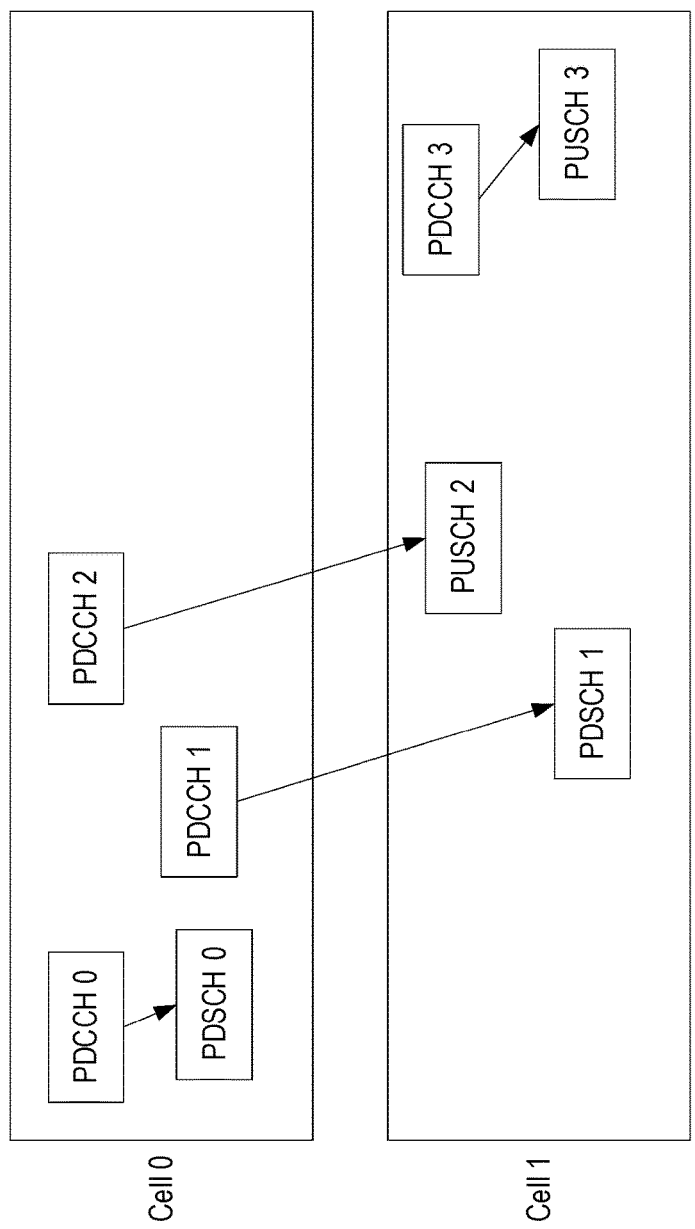
FIG. 6 illustrates another example transmission scheduling in accordance with the present technology.

FIG. 6 illustrates an example transmission scheduling 600 in accordance with the present technology. As shown in FIG. 6, the base station operates using different serving cells. For example, Cell 0 is the primary serving cell that carries the PDCCH0, PDCCH1, PDCCH2, and PDSCH0. Control information in PDCCH0 schedules data transmissions in PDSCH0. Cell 1 is a secondary serving cell that carries PDSCH1, PUSCH2, PDCCH3, and PUSCH3. PDSCH1 and PUSCH2 are scheduled by PDCCH1 and PDCCH2 on Cell 0 respectively, while PUSCH3 is scheduled by PDCCH3 on Cell 1.

In this particular example, PDSCH0 and PDSCH1 have the same HARQ process number. Because PDSCH1 is a subsequent transmission immediately following PDSCH0 in the same downlink direction (that is, there is no other transmission with the same HARQ process number between them), it can be determined that PDSCH1 corresponds to PDSCH0. Whether PDSCH1 is a retransmission of PDSCH0 or a new data transmission can be determined based on the NDI field in the control information carried in PDCCH1 (e.g., as discussed in the previous embodiments).

Similarly, PUSCH2 and PUSCH3 have the same HARQ process number. Because PUSCH3 is a subsequent uplink transmission immediately following PUSCH2 (that is, there is no other transmission with the same HARQ process number between them), it can be determined that PUSCH3 corresponds to PUSCH2. Whether PUSCH3 is a retransmission of PUSCH2 or a new data transmission can be determined based on the NDI field in the control information carried in PDCCH3 (e.g., as discussed in the previous embodiments).

Embodiment 4

In some embodiments, a serving cell can include multiple carriers. The disclosed scheduling techniques can be implemented to allow transmissions to be scheduled across multiple carriers of the same cell, thereby reducing and/or minimizing scheduling delays.

Figure 7:
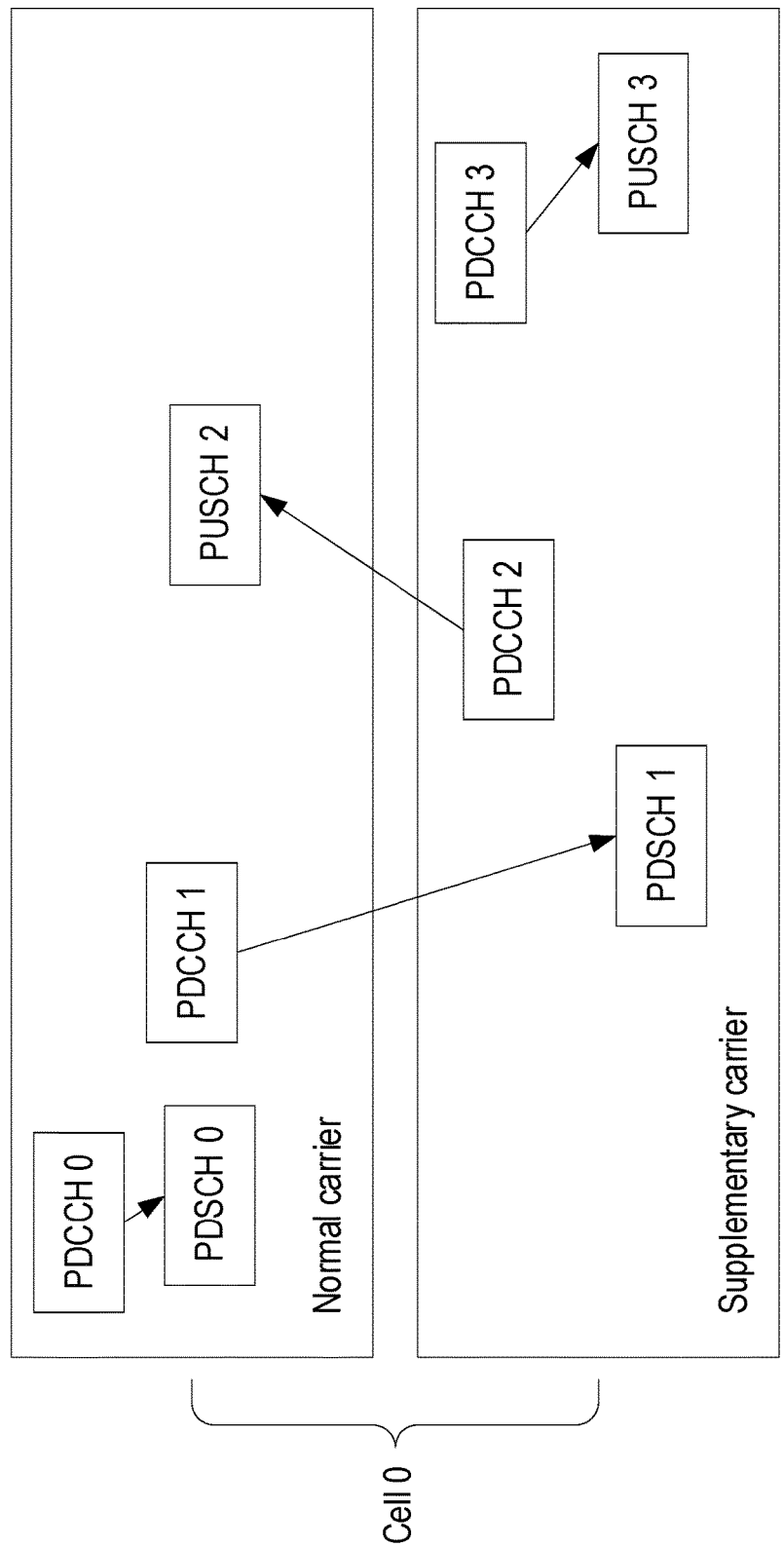
FIG. 7 illustrates yet another example transmission scheduling in accordance with the present technology.

FIG. 7 illustrates an example multi-carrier transmission scheduling 700 in accordance with the present technology. As shown in FIG. 7, Cell 0 includes a first carrier (e.g., the normal carrier) and a second carrier that is associated with the first carrier (e.g., the supplemental carrier). A transmission (e.g., a downlink transmission, an uplink transmission, and a sidelink transmission) can be transmitted on the normal carrier or on the supplementary carrier. A control channel carrying control information can be on the normal carrier or the supplementary carrier. Similarly, transmissions scheduled by the control information can be on the normal carrier or the supplementary carrier.

In the example shown in FIG. 7, the normal carrier carries the PDCCH0, PDSCH0, PDCCH1 and PUSCH2. Control information in PDCCH0 schedules data transmissions in PDSCH0. The supplemental carrier carries PDSCH1, PDCCH2, PDCCH3 and PUSCH3. Control information in PDCCH3 schedules data transmissions in PDSCH3. PDSCH1 is scheduled by PDCCH1 on the normal carrier, while PDCCH2 schedules the PUSCH2 on the normal carrier.

When there are multiple carriers in the same cell, the control information can include a carrier indication field. For example, control information in PDCCH0 includes a value 0 in the carrier indication field to indicate that the PDSCH0 is scheduled to be transmitted on the normal carrier. Control information in PDCCH1 includes a value 1 in the carrier indication field to indicate that PDSCH1 is scheduled to be transmitted on the supplemental carrier. The HARQ process number of PDSCH0 and the HARQ process number of PDSCH1 can be the same, indicating that PDSCH0 is a prior transmission that corresponds to PDSCH1. Whether PDSCH1 is a new data transmission or a retransmission of PDSCH0 can be indicated by the NDI field in the control information.

In the uplink direction, control information in PDCCH2 includes a value 0 in the carrier indication field to indicate that the PUSCH2 is scheduled to be transmitted on the normal carrier. Control information in PDCCH3 includes a value 1 in the carrier indication field to indicate that PUSCH3 is scheduled to be transmitted on the supplemental carrier. Both PUSCH2 and PUSCH3 can have the same HARQ process number, indicating that PUSCH2 is a prior transmission corresponding to PUSCH3. Whether PUSCH3 is a new data transmission or a retransmission of PUSCH2 can be indicated by the NDI field in the control information.

Embodiment 5

In 5G communication systems, a bandwidth part (BWP) occupies a part of or the entire frequency resources of the bandwidth. A user device can be configured with one or more BWPs, including active BWP(s) and inactive BWP(s). In some cases, the user device can be configured with one or more active BWPs. Some BWPs can overlap in the frequency domain. A transmission (e.g., a downlink transmission, an uplink transmission, and/or a sidelink transmission) can be transmitted on any one of the BWP. The user device can also receive and transmit signals on these BWPs simultaneously (e.g., on the same symbol, slot, sub-slot, subframe, frame, etc.). Different slot format configurations can be configured for these BWPs. Control information indicating the slot format includes a field to indicate the BWP for which the indicated slot format is used. That is the indicated slot format is used for the indicated BWP.

When the user device is configured with multiple active BWPs, the control information can include a BWP indicator field indicating which BWP is to be used for the scheduled transmission. For example, if the user device is configured with two active BWPs, e.g., the first BWP and the second BWP, the control information can include 1 bit to indicate which BWP is to be used for a particular scheduled transmission. As another example, if four active BWPs are configured, the control information can include 2 bits to indicate which BWP is to be used.

In some embodiments, a measurement is defined as a synchronization signal and Physical Broadcast Channel (PBCH) block (SSB) based intra-frequency measurement provided the center frequency of the SSB of the serving cell indicated for measurement and the center frequency of the SSB of the neighbor cell are the same. The subcarrier spacing (SCS) of the two SSB are also the same. A measurement is defined as an SSB based inter-frequency measurement provided it is not defined as an intra-frequency measurement (e.g., the center frequency of the SSB of the serving cell indicated for measurement and the center frequency of the SSB of the neighbor cell are different, or the subcarrier spacing of the two SSB are different).

In some embodiments, a measurement is defined as a channel state information reference signal (CSI-RS) based intra-frequency measurement provided that the SCS of CSI-RS resources on the neighbor cell configured for measurement is the same as the SCS of CSI-RS resources on the serving cell indicated for measurement, and the cyclic prefix (CP) type of CSI-RS resources on neighbor cell configured for measurement is the same as the CP type of CSI-RS resources on the serving cell indicated for measurement, and the center frequency of CSI-RS resources on the neighbor cell configured for measurement is the same as the center frequency of CSI-RS resource on the serving cell indicated for measurement. A measurement is defined as a CSI-RS based inter-frequency measurement if it is not a CSI-RS based intra-frequency measurement (e.g., the SCS of CSI-RS resources on the neighbor cell configured for measurement and the SCS of CSI-RS resources on the serving cell indicated for measurement are different, or the CP type of CSI-RS resources on neighbor cell configured for measurement and the CP type of CSI-RS resources on the serving cell indicated for measurement are different, or the center frequency of CSI-RS resources on the neighbor cell configured for measurement and the center frequency of CSI-RS resource on the serving cell indicated for measurement are different).

In some embodiments, a first cell and a second cell are configured with SSB and CSI-RS. In one example, the carrier frequencies of first cell and second cell are intra-frequency if both the SSB based measurement and the CSI-RS based measurement are intra-frequency measurement for the first cell and the second cell. In another example, the carrier frequencies of first cell and second cell are intra-frequency if either the SSB based measurement or the CSI-RS based measurement is intra-frequency measurement for the first cell and the second cell. In another example, the carrier frequencies of first cell and second cell are inter-frequency if either the SSB based measurement or the CSI-RS based measurement is inter-frequency measurement for the first cell and the second cell. In another example, the carrier frequencies of first cell and second cell are inter-frequency if both the SSB based measurement and the CSI-RS based measurement are inter-frequency measurement for the first cell and the second cell.

In some embodiments, the carrier frequencies of first cell and second cell are intra-frequency if the SSB is configured for measurement and the SSB based measurement is intra-frequency measurement for the first cell and the second cell. In one example, the carrier frequencies of first cell and second cell are intra-frequency if the CSI-RS is configured for measurement and the CSI-RS based measurement is intra-frequency measurement for the first cell and the second cell. In one example, the carrier frequencies of first cell and second cell are inter-frequency if the SSB is configured for measurement and the SSB based measurement is inter-frequency measurement for the first cell and the second cell. In one example, the carrier frequencies of first cell and second cell are inter-frequency if the CSI-RS is configured for measurement and the CSI-RS based measurement is inter-frequency measurement for the first cell and the second cell.

In some embodiments, the carrier frequencies of first cell and second cell are intra-frequency if only the SSB based measurement results are reported and the SSB based measurement is intra-frequency measurement for the first cell and the second cell. In one example, the carrier frequencies of first cell and second cell are intra-frequency if only the CSI-RS based measurement results are reported and the CSI-RS based measurement is intra-frequency measurement for the first cell and the second cell. In one example, the carrier frequencies of first cell and second cell are inter-frequency if only the SSB based measurement results are reported and the SSB based measurement is inter-frequency measurement for the first cell and the second cell. In one example, the carrier frequencies of first cell and second cell are inter-frequency if only the CSI-RS based measurement results are reported and the CSI-RS based measurement is inter-frequency measurement for the first cell and the second cell.

In some embodiments, whether the carrier frequencies of target cell and source cell are intra-frequency or inter-frequency is indicated by the network via a radio resource control RRC signaling, a MAC CE, or the DCI. In some embodiments, whether the carrier frequencies of target cell and source cell are intra-frequency or inter-frequency is indicated by the UE.

In some embodiments, the first cell is the source cell or the serving cell. The second cell is the target cell or a neighbor cell.

In some embodiments, when the source cell and the target cell are configured with both CSI-RS and SSB, only the configuration that both the SSB based measurement and CSI-RS based measurement are intra-frequency or inter-frequency measurement is allowed. In other words, the UE does not expect the SSB based measurement is inter-frequency measurement while the CSI-RS based measurement is intra-frequency measurement, or the SSB based measurement is intra-frequency measurement while the CSI-RS based measurement is inter-frequency measurement. The UE only expects that both the SSB based measurement and CSI-RS based measurement are intra-frequency or inter-frequency measurement.

If the carrier frequencies of target cell and source cell are not intra-frequency, and the UE does not indicate support of UL transmission cancellation during DAPS handover, and if UE does not indicate a capability for power sharing between source and target cell in DAPS handover or the UE is not provided with a power sharing scheme, the UE does not expect transmissions on the target and source cell in overlapping time resources.

If the UE indicates support of UL transmission cancellation during DAPS handover, and the carrier frequencies of target cell and source cell are not intra-frequency, and UE transmissions on the target cell and the source cell are in overlapping time resources, and if UE does not indicate a capability for power sharing between source and target cell in DAPS handover or the UE is not provided with a power sharing scheme, the UE transmits only on the target cell, and cancels the transmission to source cell.

If the carrier frequencies of target cell and source cell are intra-frequency, and UE transmissions on the target cell and the source cell overlapping time resources, the UE transmits only on the target cell and cancels the transmission on the source cell.

Figure 8:
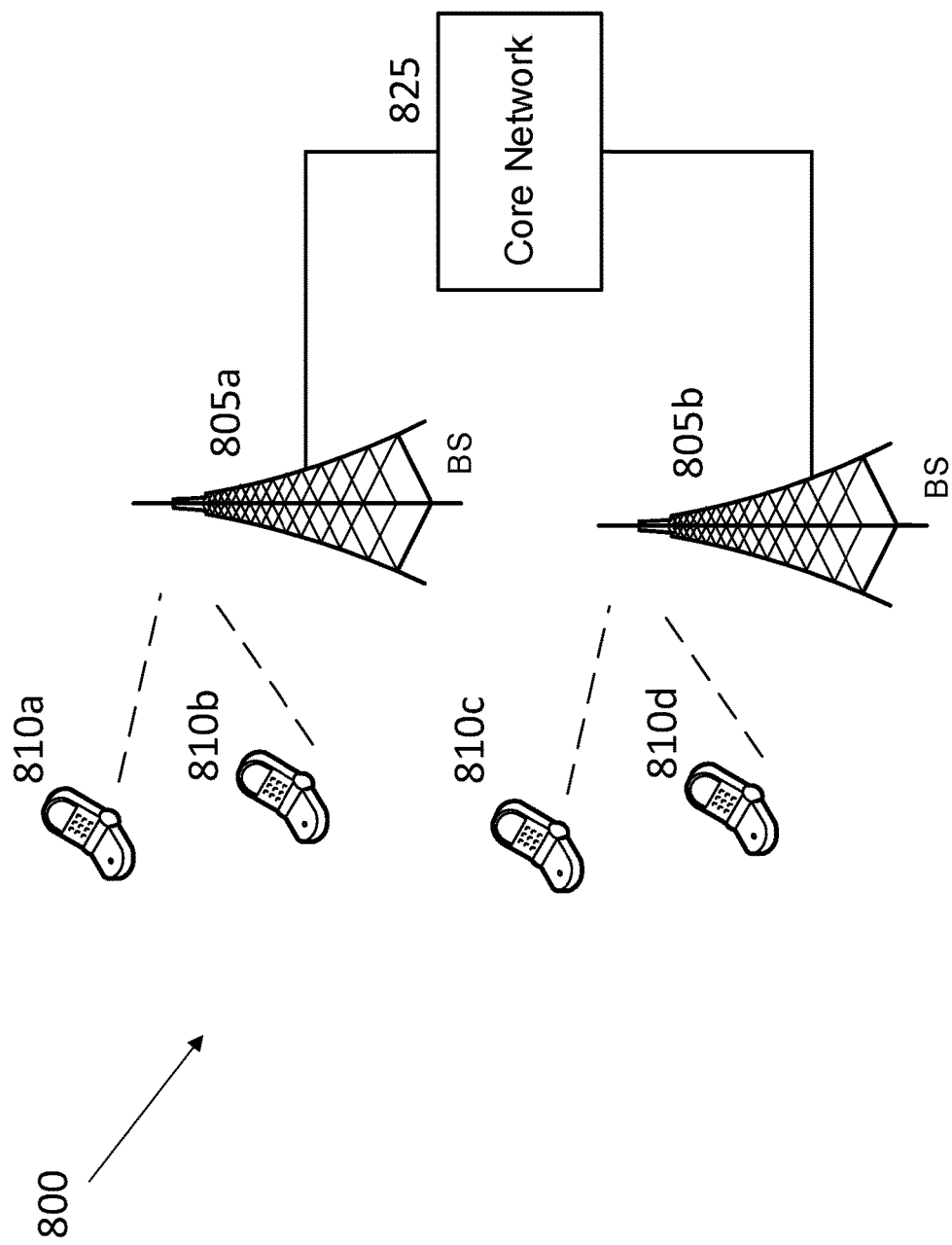
FIG. 8 shows an example of a wireless communication system where techniques in accordance with one or more embodiments of the present technology can be applied.

FIG. 8 shows an example of a wireless communication system 800 where techniques in accordance with one or more embodiments of the present technology can be applied. A wireless communication system 800 can include one or more base stations (BSs) 805a, 805b, one or more wireless devices 810a, 810b, 810c, 810d, and a core network 825. A base station 805a, 805b can provide wireless service to wireless devices 810a, 810b, 810c and 810d in one or more wireless sectors. In some implementations, a base station 805a, 805b includes directional antennas to produce two or more directional beams to provide wireless coverage in different sectors.

The core network 825 can communicate with one or more base stations 805a, 805b. The core network 825 provides connectivity with other wireless communication systems and wired communication systems. The core network may include one or more service subscription databases to store information related to the subscribed wireless devices 810a, 810b, 810c, and 810d. A first base station 805a can provide wireless service based on a first radio access technology, whereas a second base station 805b can provide wireless service based on a second radio access technology. The base stations 805a and 805b may be co-located or may be separately installed in the field according to the deployment scenario. The wireless devices 810a, 810b, 810c, and 810d can support multiple different radio access technologies. The techniques and embodiments described in the present document may be implemented by the base stations of wireless devices described in the present document.

Figure 9:
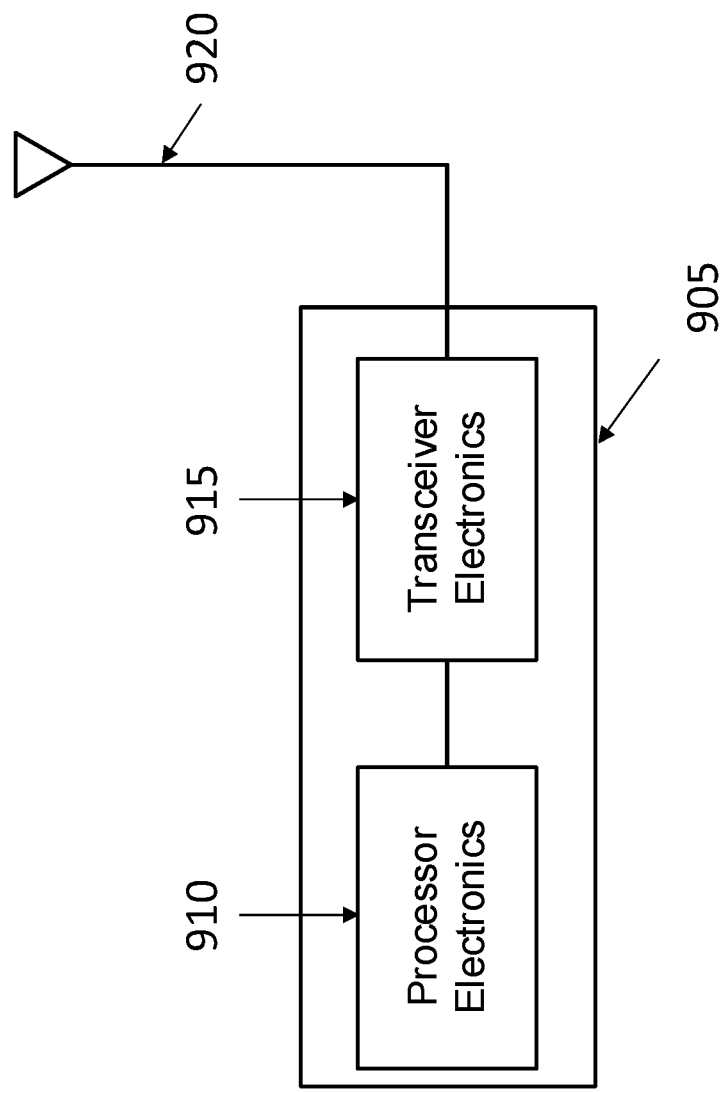
FIG. 9 is a block diagram representation of a portion of a radio station in accordance with one or more embodiments of the present technology can be applied.

FIG. 9 is a block diagram representation of a portion of a radio station in accordance with one or more embodiments of the present technology can be applied. A radio station 905 such as a base station or a wireless device (or a user device) can include processor electronics 910 such as a microprocessor that implements one or more of the wireless techniques presented in this document. The radio station 905 can include transceiver electronics 915 to send and/or receive wireless signals over one or more communication interfaces such as antenna 920. The radio station 905 can include other communication interfaces for transmitting and receiving data. Radio station 905 can include one or more memories (not explicitly shown) configured to store information such as data and/or instructions. In some implementations, the processor electronics 910 can include at least a portion of the transceiver electronics 915. In some embodiments, at least some of the disclosed techniques, modules or functions are implemented using the radio station 905. In some embodiments, the radio station 905 may be configured to perform the methods described herein.

It will be appreciated that the present document discloses techniques that can be embodied in various embodiments to schedule related data transmissions across multiple cells and/or carriers so as to minimize scheduling delay. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
transmitting, by a base station, a first control message that includes a first scheduling information of a first data transmission on a first serving cell to a user device, wherein the first control message comprises a first set of New Data Indicator (NDI) values corresponding to a first set of Transport Blocks (TBs) of the first data transmission;
processing, by the base station, the first data transmission for the user device on the first serving cell according to the first scheduling information;
transmitting, by the base station to the user device, a second control message that includes a second scheduling information of a second data transmission on a second cell that is different from the first serving cell, wherein the second control message comprises a second set of NDI values corresponding to a second set of TBs of the second data transmission,
wherein the second control message indicates that a TB of the second data transmission is a retransmission of a corresponding TB of the first data transmission upon an NDI value of the TB in the second control message being a same as a prior NDI value of the corresponding TB in the first control message, wherein the first data transmission is a prior transmission corresponding to the second data transmission, and wherein the second control message comprises a first identifier for the first serving cell and a first Hybrid Automatic Repeat Request (HARQ) process number for the first data transmission, the second control message further comprising a second identifier for the second cell and a second HARQ process number for the second data transmission; and processing, by the base station, the second data transmission for the user device on the second cell according to the second scheduling information.

2. The method of claim 1, wherein the second control message comprises a second identifier for the second cell and a second HARQ process number for the second data transmission, wherein there exists an association between the second cell and the first serving cell, and the association specifies that a first set of HARQ processes of the first serving cell corresponds to a second set of HARQ processes of the second cell or that the first serving cell and the second cell share a same HARQ process or a same HARQ entity.

3. The method of claim 1, wherein whether the second data transmission is a new data transmission or a retransmission of the first data transmission is determined based on a first HARQ process number of the first data transmission and a second HARQ process number of the second data transmission, and wherein the second data transmission is a retransmission of the first data transmission in case the second HARQ process number belongs to s second set of the HARQ processes of the second cell.

4. The method of claim 1, wherein the first serving cell comprises a first carrier and a second carrier that is associated with the first carrier, wherein the first data transmission is performed in the first carrier of the first serving cell, and the method further comprising:

transmitting, by the base station to the user device, a third control message that includes a third scheduling information of a third data transmission or the second data transmission in a second carrier of the first serving cell, wherein the third control message comprises an indicator indicating a carrier to be used for the second data transmission or the third data transmission; and processing, by the base station, the second data transmission or the third data transmission for the user device in the second carrier according to the third scheduling information.

5. A method for wireless communication, comprising:

receiving, by a user device, a first control message that includes a first scheduling information of a first data transmission on a first serving cell from a base station, wherein the first control message comprises a first set of New Data Indicator (NDI) values corresponding to a first set of Transport Blocks (TBs) of the first data transmission;

processing, by the user device, the first data transmission on the first serving cell according to the first scheduling information;

receiving, by the user device, a second control message from the base station including a second scheduling information of a second data transmission on a second cell that is different than the first serving cell, wherein the second control message comprises a second set of NDI values corresponding to a second set of TBs of the second data transmission, wherein the second control message indicates that a TB of the second data transmission is a retransmission of a corresponding TB of the first data transmission upon an NDI value of the TB in the second control message being a same as a prior NDI value of the corresponding TB in the first control message, wherein the first data transmission is a prior transmission corresponding to the second data transmission, and wherein the second control message comprises a first identifier for the first serving cell and a first Hybrid Automatic Repeat Request (HARQ) process number for the first data transmission, the second control message further comprising a second identifier for the second cell and a second HARQ process number for the second data transmission; and processing, by the user device, the second data transmission on the second cell according to the second scheduling information.

6. The method of claim 5, wherein the second control message comprises a second identifier for the second cell and a second HARQ process number for the second data transmission, and wherein there exists an association between the second cell and the first serving cell, and the association specifies that a first set of HARQ processes of the first serving cell corresponds to a second set of HARQ processes of the second cell or that the first serving cell and the second cell share a same HARQ process or a same HARQ entity.

7. The method of claim 5, wherein whether the second data transmission is a new data transmission or a retransmission of the first data transmission is determined based on a first HARQ process number of the first data transmission and a second HARQ process number of the second data transmission, and wherein the second data transmission is a retransmission of the first data transmission in case the second HARQ process number belongs to a second set of the HARQ processes of the first serving cell.

8. The method of claim 5, wherein the first serving cell comprises a first carrier and a second carrier that is associated with the first carrier, wherein the first data transmission is performed in the first carrier of the first serving cell, and the method further comprising:

receiving, by the user device from the base station, a third control message that includes a third scheduling information of a third data transmission or the second data transmission in a second carrier of the first serving cell, wherein the third control message comprises an indicator indicating a carrier to be used for the second data transmission or the third data transmission; and performing, by the user device, the second data transmission or the third data transmission with the base station in the second carrier according to the third scheduling information.

9. A communication apparatus, comprising a processor configured to:

transmit a first control message that includes a first scheduling information of a first data transmission on a first serving cell to a user device, wherein the first control message comprises a first set of New Data Indicator (NDI) values corresponding to a first set of Transport Blocks (TBs) of the first data transmission;

process the first data transmission for the user device on the first serving cell according to the first scheduling information;

transmit, to the user device, a second control message that includes a second scheduling information of a second data transmission on a second cell that is different from the first serving cell, wherein the second control message comprises a second set of NDI values corresponding to a second set of TBs of the second data transmission, wherein the second control message indicates that a TB of the second data transmission is a retransmission of a corresponding TB of the first data transmission upon an NDI value of the TB in the second control message being a same as a prior NDI value of the corresponding TB in the first control message, wherein the first data transmission is a prior transmission corresponding to the second data transmission, and wherein the second control message comprises a first identifier for the first serving cell and a first Hybrid Automatic Repeat Request (HARQ) process number for the first data transmission, the second control message further comprising a second identifier for the second cell and a second HARQ process number for the second data transmission; and process the second data transmission for the user device on the second cell according to the second scheduling information.

10. The communication apparatus of claim 9, wherein the second control message comprises a second identifier for the second cell and a second HARQ process number for the second data transmission, wherein there exists an association between the second cell and the first serving cell, and the association specifies that a first set of HARQ processes of the first serving cell corresponds to a second set of HARQ processes of the second cell or that the first serving cell and the second cell share a same HARQ process or a same HARQ entity.

11. The communication apparatus of claim 9, wherein whether the second data transmission is a new data transmission or a retransmission of the first data transmission is determined based on a first HARQ process number of the first data transmission and a second HARQ process number of the second data transmission, and, wherein the second data transmission is a retransmission of the first data transmission in case the second HARQ process number belongs to a second set of the HARQ processes of the second cell.

12. The communication apparatus of claim 9, wherein the first serving cell comprises a first carrier and a second carrier that is associated with the first carrier, wherein the first data transmission is performed in the first carrier of the first serving cell, and wherein the processor is further configured to:

transmit, to the user device, a third control message that includes a third scheduling information of a third data transmission or the second data transmission in a second carrier of the first serving cell, wherein the third control message comprises an indicator indicating a carrier to be used for the second data transmission or the third data transmission; and process the second data transmission or the third data transmission for the user device in the second carrier.

13. A communication apparatus, comprising a processor configured to:

receive a first control message that includes a first scheduling information of a first data transmission on a first serving cell from a base station, wherein the first control message comprises a first set of New Data Indicator (NDI) values corresponding to a first set of Transport Blocks (TBs) of the first data transmission;

process the first data transmission on the first serving cell according to the first scheduling information;

receive a second control message from the base station including a second scheduling information of a second data transmission on a second cell that is different than the first serving cell, wherein the second control message comprises a second set of NDI values corresponding to a second set of TBs of the second data transmission, wherein the second control message indicates that a TB of the second data transmission is a retransmission of a corresponding TB of the first data transmission upon an NDI value of the TB in the second control message being a same as a prior NDI value of the corresponding TB in the first control message, wherein the first data transmission is a prior transmission corresponding to the second data transmission, and wherein the second control message comprises a first identifier for the first serving cell and a first Hybrid Automatic Repeat Request (HARQ) process number for the first data transmission, the second control message further comprising a second identifier for the second cell and a second HARQ process number for the second data transmission; and process the second data transmission on the second cell according to the second scheduling information.

14. The communication apparatus of claim 13, wherein the second control message comprises a second identifier for the second cell and a second HARQ process number for the second data transmission, and wherein there exists an association between the second cell and the first serving cell, and the association specifies that a first set of HARQ processes of the first serving cell corresponds to a second set of HARQ processes of the second cell or that the first serving cell and the second cell share a same HARQ process or a same HARQ entity.

15. The communication apparatus of claim 13, wherein whether the second data transmission is a new data transmission or a retransmission of the first data transmission is determined based on a first HARQ process number of the first data transmission and a second HARQ process number of the second data transmission, and wherein the second data transmission is a retransmission of the first data transmission in case the second HARQ process number belongs to a second set of the HARQ processes of the first serving cell.

16. The communication apparatus of claim 13, wherein the first serving cell comprises a first carrier and a second carrier that is associated with the first carrier, wherein the first data transmission is performed in the first carrier of the first serving cell, and the processor is further configured to:

receive a third control message that includes a third scheduling information of a third data transmission or the second data transmission in a second carrier of the first serving cell, wherein the third control message comprises an indicator indicating a carrier to be used for the second data transmission or the third data transmission; and perform the second data transmission or the third data transmission with the base station in the second carrier according to the third scheduling information.

* * * * *